(12) United States Patent
Baird et al.

(10) Patent No.: US 7,197,215 B2
(45) Date of Patent: Mar. 27, 2007

(54) FIBER OPTIC CABLES WITH EASY ACCESS FEATURES

(75) Inventors: Paul R. Baird, Hickory, NC (US); Eric R. Logan, Hickory, NC (US); Richard S. Wagman, Hickory, NC (US)

(73) Assignee: Corning Cable Systems, LLC., Hickory, NC (US)

( * ) Notice: Subject to any disclaimer, the term of this patent is extended or adjusted under 35 U.S.C. 154(b) by 0 days.

(21) Appl. No.: 11/012,659

(22) Filed: Dec. 15, 2004

(65) Prior Publication Data

US 2006/0127016 A1   Jun. 15, 2006

(51) Int. Cl.
*G02B 6/44* (2006.01)
(52) U.S. Cl. ....................... 385/113; 385/100
(58) Field of Classification Search ................ 385/100, 385/101, 106, 111–114
See application file for complete search history.

(56) References Cited

U.S. PATENT DOCUMENTS

| | | | | |
|---|---|---|---|---|
| 5,970,196 A | * | 10/1999 | Greveling et al. | 385/114 |
| 6,304,699 B2 | * | 10/2001 | Field et al. | 385/100 |
| 6,304,701 B1 | * | 10/2001 | Bringuier et al. | 385/106 |
| 6,324,324 B1 | * | 11/2001 | Dixon et al. | 385/100 |
| 6,377,738 B1 | * | 4/2002 | Anderson et al. | 385/113 |
| 6,603,908 B2 | * | 8/2003 | Dallas et al. | 385/109 |
| 6,671,441 B1 | * | 12/2003 | Bocanegra et al. | 385/112 |

* cited by examiner

*Primary Examiner*—Sung Pak
*Assistant Examiner*—Tina M. Wong

(57) ABSTRACT

A tubeless fiber optic cable is disclosed, including at least one optical fiber extending in a longitudinal direction, and an outer jacket extending in the longitudinal direction so as to surround the optical fiber. The outer jacket has a cross-section defining an inner surface and an outer surface. At least one strength member extends in the longitudinal direction along the outer jacket and is disposed so that a portion thereof protrudes from the inner surface of the outer jacket, so that when a ripcord is pulled from the outer jacket separation of the outer jacket occurs, thereby allowing access to a cavity containing the optical fiber. In another embodiment, the ripcord protrudes from the inner surface of the outer jacket.

20 Claims, 3 Drawing Sheets

FIBER OPTIC CABLES WITH EASY ACCESS FEATURES

FIELD OF THE INVENTION

The present invention relates generally to fiber optic cable designs that include features for entering outer jackets of the cables, thereby allowing the craftsman quick and easy access to the optical fibers within the cable.

BACKGROUND OF THE INVENTION

Various types of fiber optic cable designs have been proposed. For example, outdoor long-haul applications use loose-tube cables in which one or more optical fibers are disposed loosely within a plastic buffer tube filled with a thixotropic material. Generally speaking, outdoor cables are robust designs intended to protect the optical fibers from the environment, rodents, installation techniques, etc. The buffer tube for the outdoor cable serves several functions such as protecting the optical fiber(s) therein along with segregating and grouping the optical fiber(s). Likewise, the thixotropic material in the buffer tube also performs several functions, including coupling the fiber(s) to the tube, cushioning the fiber(s), and preventing collapse of the tube during extrusion. Perhaps the most important feature of the buffer tube is that it prevents the craftsman from damaging the optical fibers when opening the jacket. In other words, when the craftsman opens a fiber optic cable jacket with a utility knife, the buffer tube prevents the knife from contacting and damaging optical fibers. However, removing or cutting into the buffer tube adds an additional step when trying to access optical fibers.

Tubeless cables have been proposed for outdoor applications in which one or more fibers are disposed within an outer jacket without being held in a buffer tube. However, tubeless designs have not achieved acceptance in the craft, at least in part because of perceived concern of inadvertently damaging the optical fibers when removing the robust outer jacket. For example, at times, optical fibers have been inadvertently cut or nicked by the craft when attempting to access the fibers during the opening of the robust cable jacket.

Accordingly, the present invention is directed to tubeless fiber optic cable designs that substantially obviates one or more of the problems and disadvantages of the prior art. Additional features and advantages of the invention will be set forth in the description that follows, and in part will be apparent from the description, or may be learned by practice of the invention. The objectives and other advantages of the invention will be realized and attained by the apparatus and process particularly pointed out in the written description and claims, as well as the appended drawings

SUMMARY OF THE INVENTION

According to certain aspects of the invention, a tubeless fiber optic cable is disclosed including at least one optical fiber extending in a longitudinal direction, and an outer jacket extending in the longitudinal direction so as to surround the optical fiber. The outer jacket has a cross-section defining an inner surface and an outer surface with the inner surface defining a cavity. A plurality of strength members extend in the longitudinal direction along the outer jacket, the strength members being disposed so that at least a portion protrudes from the inner surface of the outer jacket. A ripcord extends in the longitudinal direction along the outer jacket, the ripcord being disposed within the outer jacket and substantially adjacent the strength members, whereby the outer jacket, strength members and ripcord are oriented so that removal of material from the outer jacket adjacent the ripcord exposes the ripcord, and ripping a portion of the ripcord from the outer jacket provides for separation of the outer jacket, thereby allowing for access to the cavity. Various options and modifications are possible.

For example, the fiber optic cable may further include additional strength members and with a respective ripcord arranged in a group, the additional strength members and respective ripcord being at least partially disposed within the outer jacket substantially opposite the plurality of strength members and its ripcord. Also, at least one of the outer jacket cross-section inner or outer surfaces may be generally round and the other of the outer jacket cross-section inner or outer surfaces comprises a generally non-round shape, such as an oval. Likewise, both the inner and outer cross-sections of the outer jacket can be non-round.

If desired, according to certain other aspects of the invention, the above structure may be modified or supplemented so that the ripcord protrudes from the outer jacket inner surface. Also, according to other aspects of the invention, at least one strength member is disposed to protrude from the inner surface of the outer jacket, with or without a ripcord. Finally, according to certain other aspects of the invention, the above concepts can be applied to fiber optic cables other than the tubeless variety.

DETAILED DESCRIPTION OF THE INVENTION

Figure 1:
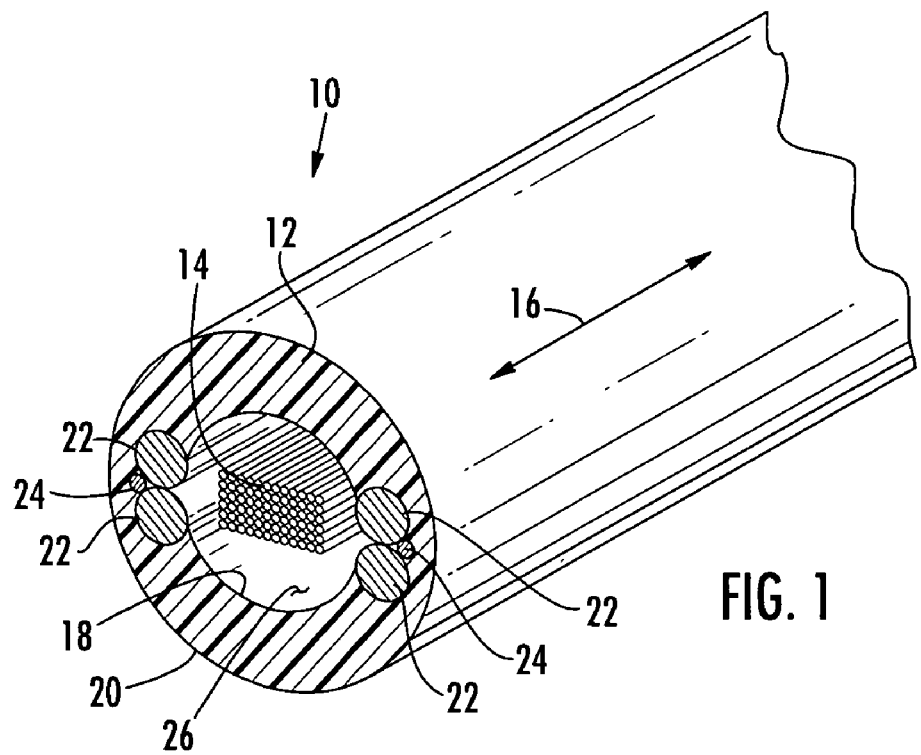
FIG. 1 is a perspective view of a fiber optic cable according to certain aspects of the present invention.
Figure 2:
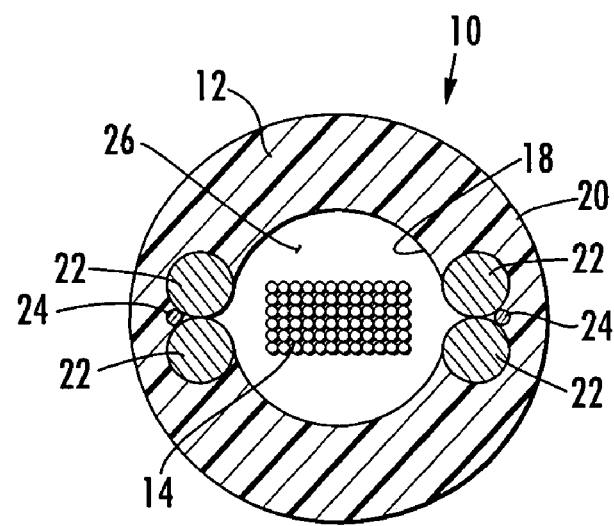
FIG. 2 is an end view of the fiber optic cable of FIG. 1.

Detailed reference will now be made to the drawings in which examples embodying the present invention are shown. The detailed description uses numerical and letter designations to refer to features in the drawings. Like or similar designations in the drawings and description have been used to refer to like or similar parts of the invention.

The drawings and detailed description provide a full and written description of the invention, and of the manner and process of making and using it, so as to enable one skilled in the pertinent art to make and use it, as well as the best mode of carrying out the invention. However, the examples set forth in the drawings and detailed description are provided by way of explanation of the invention and are not meant as limitations of the invention. The present invention thus includes many modifications and variations of the following examples as come within the scope of the appended claims and their equivalents.

Examples of fiber optic cables according to various aspects of the present invention are disclosed in the figures, as described below. The various disclosed aspects of the embodiments below may be combined or modified to create further embodiments of the invention.

FIGS. 1–4 depict a first example of a tubeless fiber optic cable 10 including certain features of the present invention. As used herein, "tubeless" means a fiber optic cable including an outer jacket having the optical fibers disposed therein, but no buffer tube is disposed between the outer jacket and the optical fibers. The tubeless fiber optic cables of the present invention provide easy access to the optical fibers therein by eliminating the step of removing a buffer tube, while greatly reducing or eliminating the risk of damaging the optical fibers during the access procedure. As shown, fiber optic cable 10 includes at least one optical fiber 14 generally disposed within a cavity 26 of an outer jacket 12 that extends in a substantially longitudinal direction. Fiber optic cable 10 also includes at least one strength member 22 and at least one ripcord 24. The at least one optical fiber 14 of tubeless fiber optic cable 10 is a portion of a fiber optic ribbon as known in the art, which is further one ribbon of a stack of ribbons.

Although, fiber optic ribbons are depicted in fiber optic cable 10, other configurations of one or more optical fibers disposed within outer jacket 12 are possible. By way of example, optical fibers may be bundled together, loosely disposed, tight-buffered, or have other suitable configurations. A tight-buffered optical fiber should not be confused with optical fiber(s) disposed in a buffer tube. Specifically, buffer tubes typically include one or more optical fibers disposed therein that float in a water-blocking grease, i.e., a thixotropic gel. Moreover, buffer tubes typically have a relatively large inner diameter compared with the outer diameter of the optical fiber(s) therein. Whereas, one skilled in the art would understand that a buffered optical fiber such as a tight-buffered fiber typically includes a single optical fiber having a buffer layer with an inner diameter that is generally speaking closely matched to the outer diameter of the optical fiber and coupled thereto. Additionally, optical fibers 14 may be single mode, multimode, erbium-doped, plastic, polarization-maintaining, photonic, specialty, or any other suitable optical waveguide. Individual fibers or groups of fibers can also include marking indicia for identification such as an ink layer, one or more binding threads or the like for ready identification.

Outer jacket 12 extends along the longitudinal direction 16 and generally surrounds optical fibers 14. Outer jacket 12 has an inner surface 18 and an outer surface 20. Outer jacket 12 may be formed by extrusion of a material such as polyethylene, polyvinyl chloride, or any other suitable polymer. Outer jacket 12 can also include suitable additives such as for improving flame-retardant properties or for processing. Outer jacket 12 includes a cavity defined by inner surface 18 that is sized for housing the desired number and configuration of optical fibers 14 along with any other suitable cable components. For instance, outer jacket 12 may have one or more water-swellable yarns, tapes, or coatings disposed therein for inhibiting the migration of water along the cable if the same were to enter the cable.

Outer jacket 12 has at least one strength member 22 at least partially disposed therein. Specifically, tubeless fiber optic cable 10 includes four strength members 22 that are provided in groups of two, thereby imparting a preferential bend characteristic to fiber optic cable 10. Strength members 22 extend along the longitudinal direction to provide tensile strength to the cable, which inhibits the transfer of tensile forces to optical fibers 14. Additionally, strength members 22 may also provide anti-buckling characteristics to the cable. In this tubeless fiber optic cable, strength members 22 are steel wires that provide an anti-buckling characteristic. However, strength members 22 may be made of various materials depending on the application. For example, strength members 22 may comprise other conductive materials such as a copper clad steel wire, a dielectric material such as a glass-reinforced plastic (GRP), a semiconductor material, or suitable combinations thereof.

Tubeless fiber optic cable 10 also includes ripcords 24 disposed within outer jacket 12 for aiding entry into the cable and access to optical fibers 14. As depicted, ripcords 24 are provided adjacent one or more of strength members 22. In particular, ripcords 24 are disposed substantially adjacent to both groups of strength members 22. Ripcords 24 may be made of aramid fibers or any other suitable material. As shown, strength members 22 and ripcords 24 are circular in cross-section, but it should be understood that other shapes are possible within the scope of the invention. Strength members 22 and ripcords 24 are located as desired within outer jacket 12 during extrusion of the same.

Figure 3:
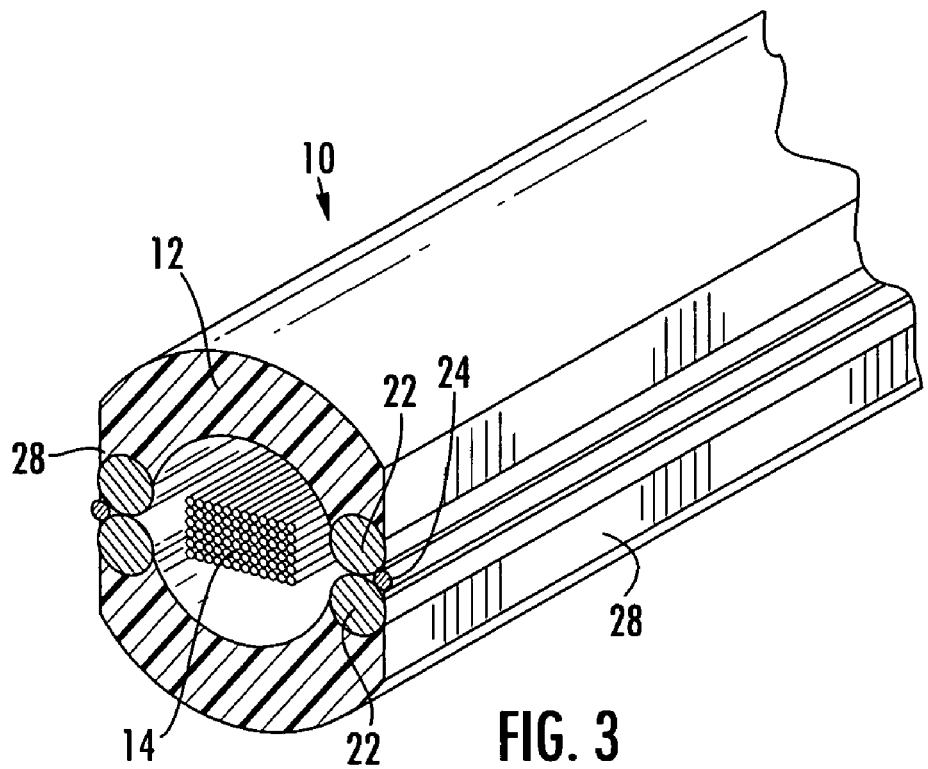
FIG. 3 is a perspective view of the fiber optic cable of FIG. 1 showing portions of the outer jacket material removed near the ripcords.
Figure 4:
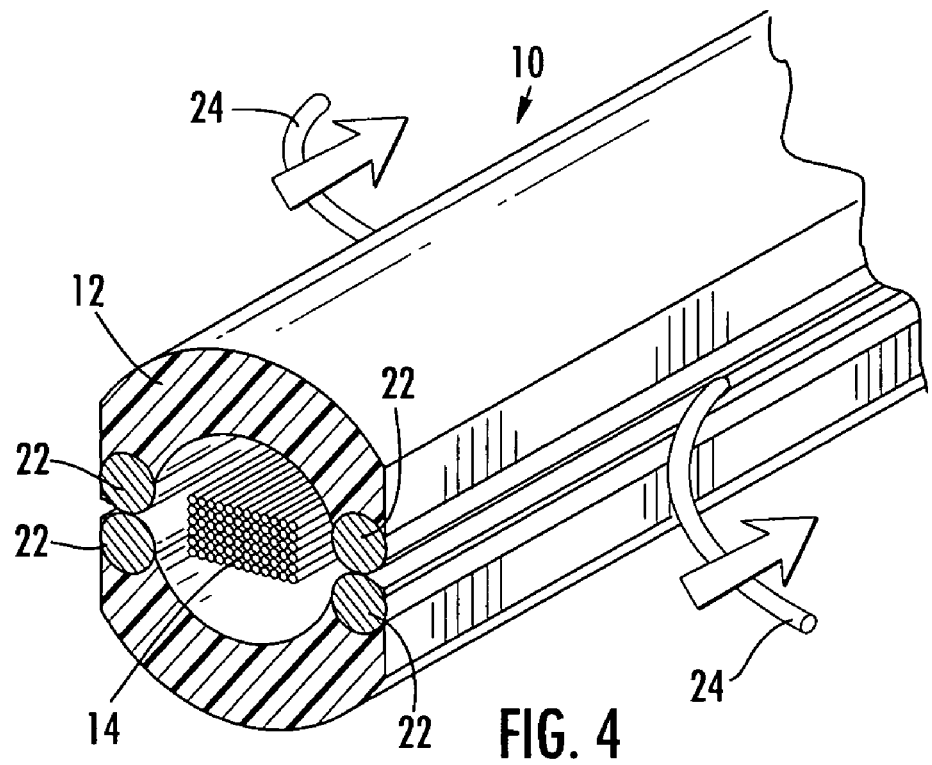
FIG. 4 is a perspective view of the fiber optic cable of FIG. 3 depicting the removal of the ripcords from the fiber optic cable.
Figure 5:
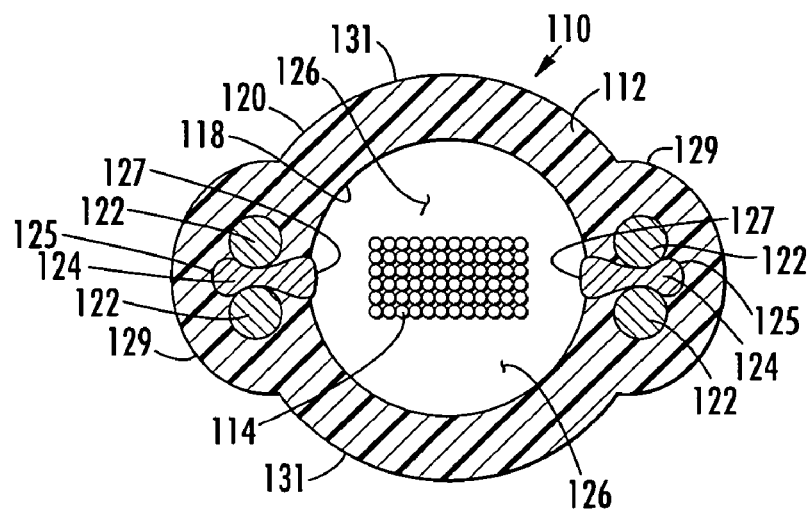
FIG. 5 is an end view of another embodiment of a fiber optic cable according to certain aspects of the present invention.

Various orientations of the one or more strength members 22 and one or more ripcords 24 are possible relative to outer jacket 12 and its inner surface 18 according to the concepts of the present invention. For example, at least one of the strength members and/or at least one of the ripcords may be located so as to protrude from the outer jacket inner surface. Illustratively, FIGS. 1–4 depict strength members 22 protruding from outer jacket inner surface 18 and FIG. 5 depicts ripcord 124 protruding from an outer jacket inner surface 118. In other embodiments, where multiple strength members 22 are used, only one strength member of each pair may protrude from the outer jacket inner surface. Additionally, other embodiments can use different numbers of strength members and/or ripcords while still employing the concepts of the invention.

Likewise, tubeless fiber optic cable 10 illustrates that strength members 22 and ripcords 24 are all in contact. However, this contact is not required and other configurations are possible. For instance, ripcord 24 may be spaced from one or more of strength members 22, and/or the strength members may be spaced from each other, if desired. The preferred orientation shown in FIGS. 1–4 provides certain optional benefits in terms of protecting the ripcord from damage when accessing the optical fibers as discussed herein and is an explanatory. Thus, other sizes, shapes and/or orientations of strength members 22 and ripcord 24 are included within the scope of the invention.

Various materials may be utilized with cavity 26 between optical fibers 14 and inner surface 18 of outer jacket 12. For example, cavity 26 may be filled with a thixotropic material such as a grease or gel, a water-swellable component(s) such as a yarn or tape, a foam-tape such as a water-swellable foam tape, other suitable cable component, or cavity 26 could be empty other than the optical fibers. In other embodiments, an intermittent filling materials are used within cavity 26, for instance, the thixotropic material, foam material, or other suitable material is intermittently disposed within the cable so as to effectively inhibit the migration of water therein.

The concepts of the present invention are advantageous because the craftsman does not have the extra steps of removing a buffer tube to access the optical fibers, while greatly reducing or eliminating the possibility of damaging the optical fibers. In other words, the tubeless fiber optic cables allow for the benefit of easy access without the risk of optical fiber damage. Specifically, FIGS. 3 and 4 show steps taken by the craft during the process of entering outer jacket 12 for accessing optical fibers 14 for tubeless fiber optic cable 10. As shown in FIG. 3, material is shaved off at least one side creating a shaved down portion 28 of outer jacket 12 to expose ripcord 24. In this case, two ripcords 24 are present as both sides are shaved away exposing both ripcords 24. The exposed ripcord(s) 24 are then ripped from outer jacket 12, thereby providing for easy separation of outer jacket 12 into two portions. Specifically, FIG. 4 shows that after ripcords 24 are pulled away, there is little if any outer jacket material present to hold outer jacket 12 together adjacent strength members 22 at the reduced thickness portion. Thus, the craftsman can easily separate the remaining portions of outer jacket 12 to gain access to cavity 26.

Although FIGS. 3 and 4 show separation of outer jacket 12 at an end, such separation could just as well be occurring as a mid-span access. Thus, to achieve mid-span access to optical fibers 14, the same process would be preformed, only at a predetermined point on the cable. In such mid-span access, any optical fiber(s) or group(s) of fibers may be exposed by separating outer jacket 12 at the desired location(s) to gain access for splicing, termination, or other purposes. By locating ripcord 24 between strength members 22, the likelihood of inadvertent cutting ripcord 24 is reduced because the two strength members act to guide the utility blade and inhibit the same from cutting ripcord 24. Also, by having one or more of strength members 22 and/or ripcord 24 protrude from inner surface 18 of outer jacket 12, the craft need not cut all the way through the outer jacket to gain access therein, thereby reducing the likelihood of damage to optical fibers by the utility blade.

FIG. 5 shows an end view of an alternate fiber optic cable design according to the present invention. As shown, fiber optic cable 110 includes an outer jacket 112, a plurality of optical fibers 114, a plurality of strength members 122, and a pair of ripcords 124. Outer jacket 112 may have various materials and/or components disposed within cavity 126, as described above. In fiber optic cable 110, strength members 122 are spaced from inner surface 118 of outer jacket 112, but ripcords 124 extend so as to protrude from inner surface 118. Additionally, ripcords 124 extend between the respective two grouped strength members 124 from a radially outer end 125 to a radially inner end 127. Ripcords 124 are formed from any suitable material such as aramid fibers.

In this embodiment, outer jacket 112 defines a cross-section in which at least one of the inner surface 118 or outer surface 120 of the outer jacket has a non-round shaped cross-section. As shown, outer surface 120 has the non-round shape, although that could be reversed within the scope of the invention. Outer surface 120 includes a thicker portion 129 adjacent each respective group of strength members 122 and ripcord 124, as compared with a plurality of thinner portions 131 spaced from the groups of strength members and ripcords. As discussed below, other cross-sections with non-round surfaces may be employed. Thicker portions 129 may provide improved crushing resistance by causing the thicker portions adjacent the strength members to support more of the load, lessening the chance of damage to the optical fibers.

Cable 110 is separable in a manner similar to that shown in FIGS. 3 and 4. First, one or both of the thicker portions 129 are shaved down to expose ripcords 124. Then, ripcord 124 is ripped to separate outer jacket 112 to allow access to the optical fibers 114. In this configuration, ripcords 124 protrude from inner surface 118 and removing portions of the same allows access to cavity 126. As above, such access may be gained at a cut end or mid-span. Also, the design of FIG. 5 may be modified in various ways, such as by including only one ripcord 124, or by employing the ripcord adjacent to fewer than two strength members.

Figure 6:
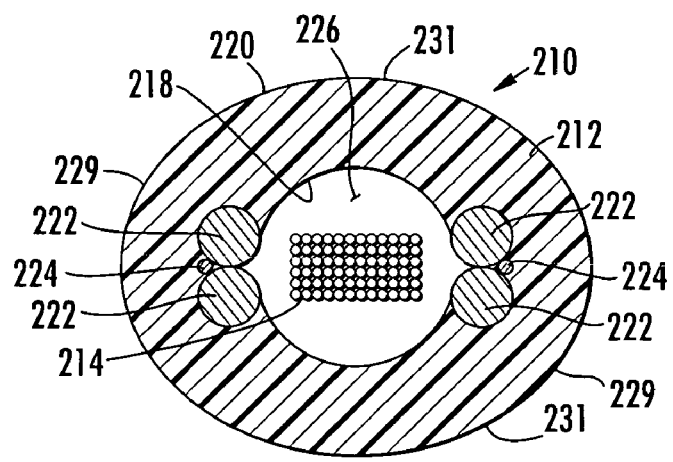
FIG. 6 is an end view of yet another embodiment of a fiber optic cable according to other aspects of the present invention.

FIG. 6 shows another alternate tubeless fiber optic cable design providing an alternate non-round configuration of the outer jacket. As illustrated, a fiber optic cable 210 includes an outer jacket 212 having a substantially round inner surface 218 and a substantially non-round outer surface 220. Outer surface 220 is a continuous curve, in this case an oval, as opposed to the discontinuous outer surface 120 of cable 110 above. Use of a continuous surface may provide benefits in some applications. A plurality of Strength members 222 and ripcords 224 are configured similar to that shown in tubeless fiber optic cable 10, with respect to their location along inner surface 218 of outer jacket 212. Relatively thicker outer jacket portions 229 are provided adjacent the strength members and ripcords for added protection.

Figure 7:
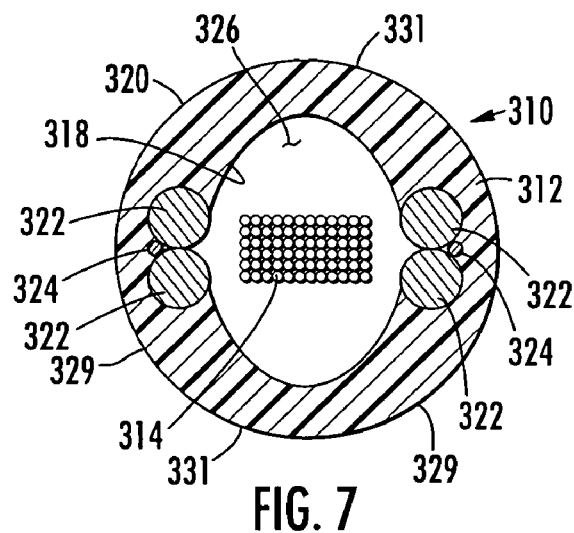
FIG. 7 is an end view of still another embodiment of a fiber optic cable according to certain other aspects of the present invention.

FIG. 7 shows another alternate tubeless fiber optic cable design providing an alternate non-round surface configuration for the outer jacket. As illustrated, a fiber optic cable 310 includes an outer jacket 312 having a substantially non-round inner surface 318 and a substantially round outer surface 320. Inner surface 318 is a continuous curve except between strength members 322, in this case generally an oval. Outer surface 320 is substantially round, which is desirable in some applications. Strength members 322 and ripcords 324 are configured similar to that shown in tubeless fiber optic cable 10, with respect to their location along inner surface 318 of outer jacket 312.

Also, the use of the non-round inner surface 318 can provide preferential bending benefits, by allowing more space within the jacket for movement of the optical fibers before contacting inner surface 318. Typically, if two strength members are to be provided spaced apart by substantially 180 degrees, the neutral axis of bending will pass though the strength members. If strength members are provided, as shown above, the neutral bending axis will pass between the pairs of strength members. Providing more space within the outer jacket spaced 90 degrees from the axis is achieved using a non-round inner surface shape. Such a configuration is particularly useful, if the internal optical fibers are twisted, stacked, bundled, etc. Thus, the non-round inner surface shape may also provide for a smaller overall bend radius for the cable. Such can also result to some extent from a non-round outer surface shape as well, where the neutral axis of bending is disposed along the strength members.

Many modifications and other embodiments of the present invention, within the scope of the appended claims, will become apparent to a skilled artisan. For example, other tubeless fiber optical cables are possible. Additionally, it is possible to extend the concepts of the present invention to fiber optic cables having buffer tubes. Therefore, it is to be understood that the invention is not to be limited to the specific embodiments disclosed herein and that modifications and other embodiments may be made within the scope of the appended claims. Although specific terms are employed herein, they are used in a generic and descriptive sense only and not for purposes of limitation.

What is claimed is:

1. A tubeless fiber optic cable comprising:
   at least one optical fiber extending in a longitudinal direction;

an outer jacket extending in the longitudinal direction so as to surround the at least one optical fiber, the outer jacket having a cross-section defining an inner surface and an outer surface with the inner surface defining a cavity in the longitudinal direction that excludes a buffer tube therein;

a plurality of strength members extending in the longitudinal direction along the outer jacket, the plurality of strength members being at least partially disposed within the outer jacket so that at least a portion of each of the plurality of strength members protrude from the inner surface of the outer jacket; and a ripcord extending in the longitudinal direction along the outer jacket, the ripcord being disposed within the outer jacket and substantially adjacent the strength members, whereby the outer jacket, strength members and ripcord are oriented so that removal of material from the outer jacket adjacent the ripcord exposes the ripcord, and ripping a portion of the ripcord from the outer jacket provides for separation of the outer jacket, thereby allowing for access to the cavity and the at least one optical fiber.

2. The tubeless fiber optic cable of claim 1, further including an additional two strength members and an additional ripcord, the additional strength members and additional ripcord being disposed within the outer jacket substantially opposite the two strength member and the ripcord.

3. The tubeless fiber optic cable of claim 1, wherein at least one of the outer jacket cross-section inner or outer surfaces is generally round and the other of the outer jacket cross-section inner or outer surfaces comprises a generally non-round shape.

4. The tubeless fiber optic cable of claim 3, wherein the generally non-round shape comprises an oval.

5. The tubeless fiber optic cable of claim 3, wherein the generally non-round shape results in a thickened outer jacket cross-section portion in the area round the strength members.

6. The tubeless fiber optic cable of claim 1, wherein the at least one optical fiber is a portion of a fiber optic ribbon.

7. The tubeless fiber optic cable of claim 1, wherein the at least one optical fiber is a tight-buffered optical fiber.

8. The tubeless fiber optic cable of claim 1, further including at least one water-swellable component within the cavity.

9. A tubeless fiber optic cable comprising:
at least one optical fiber extending in a longitudinal direction;
an outer jacket extending in the longitudinal direction so as to surround the at least one optical fiber, the outer jacket having a cross-section defining an inner surface and an outer surface, wherein the inner surface defines a cavity in the longitudinal direction;
a first strength member extending in the longitudinal direction, the at least one strength member being at least partially disposed within the outer jacket; and
a ripcord extending in the longitudinal direction at least partially disposed within the outer jacket, the ripcord being disposed so that a portion of the ripcord protrudes from the inner surface of the outer jacket, wherein the ripcord is oriented so that removal of material from the outer jacket adjacent to the ripcord exposes the ripcord, and ripping a portion of the ripcord from the outer jacket provides for separation of the outer jacket, thereby allowing entry into the cavity for accessing the at least one optical fiber.

10. The tubeless fiber optic cable of claim 9, further including a second strength member, wherein the ripcord is at least partially disposed between the first and second strength members.

11. The tubeless fiber optic cable of claim 9, further including at least two groups of strength members, each group of strength members having at least two strength members that are respectively separated by at least one ripcord, the at least one ripcord being dispose being disposed so that a portion of the ripcord protrudes from the inner surface of the outer jacket.

12. The tubeless fiber optic cable of claim 9, wherein at least one of the outer jacket cross-section inner or outer surfaces is generally round and the other of the outer jacket cross-section inner or outer surfaces comprises a generally non-round shape.

13. The tubeless fiber optic cable of claim 12, wherein the generally non-round shape results in a thickened outer jacket cross-section portion in the area round the strength members.

14. The tubeless fiber optic cable of claim 9, wherein the at least one optical fiber is a portion of a fiber optic ribbon.

15. The tubeless fiber optic cable of claim 9, wherein the at least one optical fiber is a tight buffered optical fiber.

16. The tubeless fiber optic cable of claim 9, further including at least one water-swellable component disposed within the cavity.

17. A tubeless fiber optic cable comprising:
at least one optical fiber extending in a longitudinal direction;
an outer jacket extending in the longitudinal direction so as to surround the at least one optical fiber, the outer jacket having a cross-section defining an inner surface and an outer surface with the inner surface defining a cavity in the longitudinal direction that excludes a buffer tube therein; and
a first group of strength members and a first ripcord, the first group of strength members having at least two strength members extending in the longitudinal direction along the outer jacket, wherein the first ripcord is at least partially disposed between the first group of strength members and at least partially protrudes from the inner surface of the outer jacket; and
a second group of strength members and a second ripcord, the second group of strength members having at least two strength members extending in the longitudinal direction along the outer jacket, wherein the second ripcord is at least partially disposed between the second group of strength members and at least partially protrudes from the inner surface of the outer jacket, wherein removal of respective material from the outer jacket adjacent to the first and second ripcords exposes the ripcords, and ripping a portion of the ripcords from the outer jacket provides for separation of the outer jacket, thereby allowing entry into the cavity for accessing the at least one optical fiber.

18. The fiber optic cable of claim 17, further including at least one water-swellable component disposed within the cavity.

19. The tubeless fiber optic cable of claim 18, wherein the at least one optical fiber is selected from the group consisting of a tight-buffered optical fiber, a fiber optic ribbon, and a bundle of optical fibers.

20. The tubeless fiber optic cable of claim 17, wherein at least one of the outer jacket cross-section inner or outer surfaces is generally round and the other of the outer jacket cross-section inner or outer surfaces comprises a generally non-round shape.

* * * * *